Patented Mar. 18, 1952

UNITED STATES PATENT OFFICE 2,589,686

3-SUBSTITUTED 1,4-NAPHTHOQUINONES

George Fawaz, Beirut, Lebanon, assignor to Research Corporation, New York, N. Y., a corporation of New York No Drawing. Application January 24, 1950,
Serial No. 140,350

4 Claims. (Cl. 260—396)

This invention pertains to a new and useful method for the preparation of 1,4-naphthoquinones substituted in the 3-position by alkyl and carboxyalkyl groups that can be converted by known methods into 2-hydroxy-3-substituted 1,4-naphthoquinones of high biological potency and important uses.

A large number of 2-hydroxy-3-alkyl-1,4-naphthoquinones have been investigated for antimalarial activity and many of them have been found to exhibit high suppressive, prophylactic, and curative activity against avian malarial infections [L. F. Fieser, M. T. Leffler and co-workers, J. Am. Chem. Soc., 70, 3151 (1948); L. F. Fieser and A. P. Richardson, ibid., 70, 3156 (1948)]. Those 2-hydroxy-1,4-naphthoquinones that are substituted in the 3-position by an alkyl group, or by a cycloalkylalky or an arylalkyl group, do not appear suitable for human therapy because in man they suffer rapid metabolic degradation to less active or inactive quinones in which the side chain has been oxidized or oxygenated [Fieser, Chang, Dauben, Heidelberger, Heymann and Seligman, J. Pharm. Exptl. Therap., 94, 85 (1948)]. Fortunately this fault can be corrected by introduction, in the course of synthesis, of a suitable oxygen function in a hydrocarbon side chain of size adequate to provide satisfactory biological potency. Thus the most satisfactory curative drug of the series thus far developed has a side chain of 19 carbon atoms containing a hydroxyl group now called lapinone.

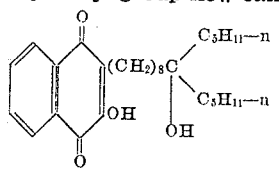

Lapinone
2-hydroxy-3-(9'-hydroxy-9'-n-amyltetradecyl)-1,4-naphthoquinone

Although members of the series that contain unoxygenated side chains appear to have little promise as antimalarial drugs for human therapy, certain of these compounds appear to be of considerable value as insecticides. Thus they are highly toxic to mites and aphids, and they present no hazards to mammals.

A serious limitation in utilization of these valuable products has been that they are not very readily available by known methods of synthesis. The synthetic method heretofore most widely used utilizes the reaction of alkylation of 2-hydroxy-1,4-naphthoquinone with the peroxide of an acid [Fieser, Leffler and co-workers, J. Am. Chem. Soc., 70, 3174–3215 (1948); Fieser, U. S. Patent 2,398,418]. The synthesis is short and the reaction affords a convenient method of preparing small samples of a large number of compounds for exploration of the relationship of structure to biological activity. For manufacturing purposes, peroxide alkylation suffers the serious disadvantage that one of two moles of the intermediate acid is wasted and that the yield is often far short of that theoretically realizable. Thus yields of quinones of type I, which are useful as insecticides, are only moderate, and still less favorable results are obtained in the

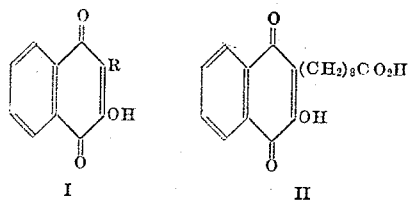

synthesis of carboxyalkyl derivatives such as II, which was obtained in this way in small quantity as an intermediate [Fieser and R. B. Turner, J. Am. Chem. Soc., 69, 2338 (1947)] for synthesis of lapinone [Fieser and G. Fawaz, J. Am. Chem. Soc., 70, 3211 (1948)]. In the latter case the required peroxide has to be made, with considerable labor and loss, from sebacic acid through ethyl hydrogen sebacate and ethyl sebacyl chloride and the alkylation proceeds very poorly.

The new synthesis here disclosed represents an entirely different approach; it involves no peroxide alkylation step and does not require a costly, preformed naphthoquinone as starting material. Instead, the quinone ring is formed, in a convenient and novel manner, after the side chain has been introduced. The starting materials are abundantly available substances: α-naphthol and a free fatty or a free dibasic acid. The reactions are well suited to operation on a manufacturing scale. In brief, the steps for synethesis of a 2-hydroxy-2-alkyl-1,4-naphthoquinone are as follows: α-naphthol is acylated at the 2-position with a free acid in presence of a catalyst to give III; the ketonaphthol III is reduced by the Clemmensen method to the 2-alkyl-1-naphthol IV, and this is oxidized directly to the 2-alkyl-1,4-naphthoquinone

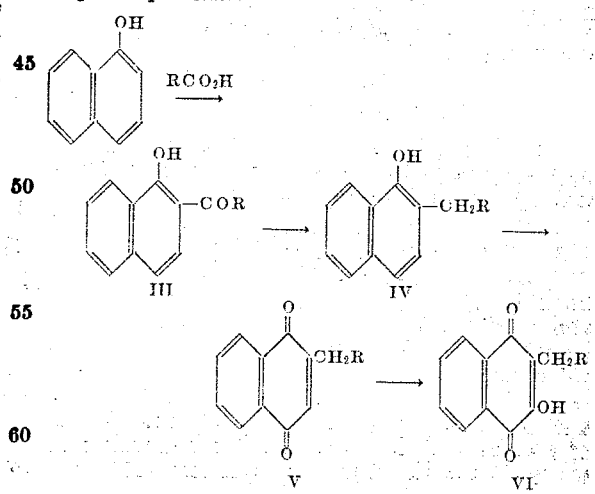

V with chromic acid. A hydroxyl group is then introduced at the remaining free position in the quinone ring by one of the known methods, such as through the 2,3-oxide [Fieser, U. S. Patent 2,312,535], or a 3-halo derivative [Fieser, J. Am. Chem. Soc., 70, 3165 (1948)]. The same method is applicable to the preparation of quinones having a carboxyalkyl side chain.

Lauroyl, myricoyl, cyclohexylbutyryl and related groups can be introduced at the 2-position in high yield by condensation of the appropriate acid with α-naphthol in the presence of boron fluoride etherate. When α-naphthol is condensed with sebacic acid under catalysis by zinc chloride 2-sebacoyl-1-naphthol (VII) is the chief product and can be The dried material is then boiled with 400 cc. of acetic acid and the solution filtered through a hot funnel from an undissolved residue consisting mainly of sebacoyl-bis-naphthol.

The remove further traces of the bis-product, the crude sebacoylnaphthol that crystallizes from the acetic acid filtrate may be treated in one of two ways. (a) It is boiled five minutes with ten parts of ethyl acetate and the solution is filtered hot from a residue consisting of mono- and bis-product; the filtrate on cooling deposits 90–100 g. (40–44%) of crystals melting at 136–137° C. to a clear fluid. (b) The crude acid is boiled for at least ten minutes with 8% sodium bicarbonate (1.5 g. of bicarbonate per g. of material) and the solution filtered hot from the bis-product and

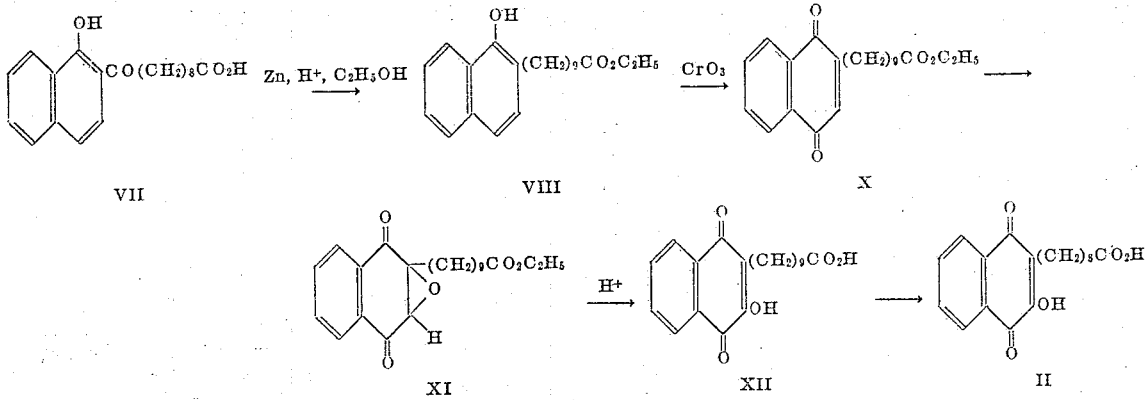

separated from a small amount of the bis-product and obtained easily in 40–44% yield.

Clemmensen reduction of the keto acid VII in alcoholic solution affords the reduced ester VIII, and this can be converted into the quinone ester IX by oxidation with chromic acid or chromic anhydride. The oxide in XI is obtained in high yield and can be converted by treatment with 96% sulfuric acid and subsequent acid hydrolysis into the hydroxynaphthoquinonyldecanoic acid X. Hooker oxidation by the improved two-step process [Fieser and Fieser, J. Am. Chem. Soc., 70, 3215 (1948)] is conducted satisfactorily on a large scale and affords the desired intermediate hydroxynaphthoquinonylnonanoic acid (II).

Acid chlorides, alkyl esters, or α-naphthol esters can be used as well in the condensation but offer no advantages over the more accessible free acids.

The synthesis is capable of wide variation and affords a practicable route to a variety of alkyl and carboxyalkyl derivatives hitherto accessible in quantity only with considerable difficulty. The examples given merely illustrate the principles of the invention.

EXAMPLE 1

2-sebacoyl-1-naphthol (VII)

A 200-g. portion of sebacic acid is melted in a flask equipped with a thermometer and mechanical stirrer and the temperature is brought to 135–137° C. and maintained at this point during addition of 140 g. of freshly fused and finely powdered zinc chloride, followed by 100 g. of α-naphthol introduced in five minutes. Heating and stirring are continued for thirty minutes longer and the melt is poured into water with vigorous stirring. The granular product is collected and washed with hot water and then with a little cold alcohol; it is then boiled with 500 cc. of alcohol, cooled, filtered, and washed with cold alcohol until the filtrate is colorless (300 cc.).

neutralized cautiously while hot with hydrochloric acid. Crystallization from acetic acid then gives material of the same quality and yield as in (a). The pure acid melts at 137.5–139° C.

EXAMPLE 2

Ethyl ω-(1,4-naphthoquinonyl-2)-decanoate (X)

A solution of 100 g. of 2-sebacoyl-1-naphthol in 2 l. of 95% alcohol is treated with 500 cc. of 36% hydrochloric acid in 100 g. of freshly poured zinc amalgamated by shaking for fifteen minutes with 10 g. of mercuric chloride in 8 cc. of 36% hydrochloric acid and 140 cc. of water. The mixture is refluxed vigorously for seven hours, diluted with 2.5 volumes of water, and the oily ethyl ω-(1-hydroxy-2-naphthyl)-decanoate (VIII) collected by ether extraction. After removal of last traces of ether in vacuum at a temperature not exceeding 50° C., the oil (about 100 g.) is dissolved in 800 cc. of acetic acid and treated with a solution of 120 g. of chromic anhydride in 75 cc. each of water and acetic acid, added over thirty minutes. The temperature is maintained at 50° C. by cooling during the addition; when the temperature begins to drop the flask is placed in a the starting material and size of batch. The green solution is then diluted with 2.5 volumes of water and the dark sticky precipitate is collected the next day, crystallized from 250 cc. of acetic acid-water (5:1), and the yellow needles washed with 100 cc. of acetic acid-water (1:1); M. P. 73–74° C. The yield varies with the quality of the starting material and size of batch. The average yield in several 100-g. runs was 32 g. (29.5% overall from the keto acid). The pure ester crystallizes from acetic acid or methanol in long yellow needles, M. P. 74–75° C.

EXAMPLE 3

Ethyl ω-(3-hydroxy-1,4-naphthoquinonyl-2)-decanoate oxide (XI)

To a solution of 100 g. of the quinone ester in 500 cc. of dioxane, a solution of 30 g. of sodium carbonate in 170 cc. of water and 70 cc. of hydrogen peroxide are added, and the mixture is kept at 70° C. for ten minutes, when the salts dissolve, evolution of gas ceases, and the oxide partly separates as an oil. An equal volume of water is added and on cooling and scratching the product is obtained as a granular white solid. Dried to constant weight at 40° C., it melts at 54–56° C. and requires no purification prior to hydrolysis; yield 98.0 g. (93%).

A sample crystallized from ligroin melted at 56–58° C.

EXAMPLE 4

ω - (3 - hydroxy - 1,4 - naphthoquinoyl - 2) - decanoic acid (XII)

One hundred g. of the above oxide ester is slowly stirred into 400 cc. of 96% sulfuric acid that has been chilled to 5° C. The mixture is stirred at room temperature for one-half hour to effect complete solution (yellow changing to deep red) and then poured into 600 cc. of ice and 2 l. of acetic acid and heated on the steam bath for two hours. (The treatment with cold sulfuric acid gives a mixture of acid and ester and the purpose of the after treatment is to effect complete hydrolysis; a little ester may appear as an oil at the start but later dissolves.) The dark solution on cooling deposits dull yellow needles (88.8 g.) M. P. 93–95° C. to a dark liquid. Crystallization from acetic acid gives light yellow needles, M. P. 104–105° C. (yellow melt); yield (dried to constant weight) 86.8 g. (94%).

EXAMPLE 5

ω - (3 - hydroxy - 1,4 - naphthoquinonyl - 2) - nonanoic acid (II)

A solution of 172.2 g. of hydroxynaphthoquinonyldecanoic acid in 1250 cc. of purified dioxane mixed with 60 g. of sodium carbonate in 1250 cc. of water is swept with a stream of pure nitrogen, 100 cc. of superoxol is added, and the red solution heated in a bath at 67–70° C. until decolorized (usually one or two hours). After cooling, 100 cc. of 36% hydrochloric acid is added, sulfur dioxide is bubbled in until an excess is noted by odor (about one hour), the excess is removed with a stream of nitrogen (two hours), and 400 g. of sodium hydroxide is added as a 25% solution, followed by copper sulfate solution (458 g. of crystals partially dissolved in 1 l. of water). The mixture is heated on the steam bath for one-half hour, let stand at 25° C. for one-half hour, and filtered through Super-Cel. The deep red solution is then slowly stirred into 500 cc. of 36% hydrochloric acid containing pieces of ice. The light yellow precipitate melts at 116–118° C.; yield 120 g. (73%). One crystallization from acetic acid gave pure acid, M. P. 124.5–125.5° C. [see Fieser and Turner, J. Am. Chem. Soc., 69, 2338 (1947)].

EXAMPLE 6

ω-(1,4-naphthoquinonyl-2)-decanoic acid

Hydrolysis of the corresponding ethyl ester in the oxidized form is not feasible because of sensitivity of the quinone ring to acids and bases. The acid is obtained by reducing the ester in alcohol with aqueous hydrosulfite, extracting the hydroquinone from the ether with repeated portions of alkaline hydrosulfite (kryptophenol), neutralizing the yellow extract with acetic acid, extracting with ether, and shaking the blue fluorescent solution with silver oxide. The quinone acid crystallizes from methanol water or dilute acetic acid in light yellow needles, M. P. 109–110° C.

Hydrolysis is also accomplished by shaking a solution of 1 g. of ester in 10 cc. of acetic acid with 0.5 g. of zinc dust until the color is largely discharged, adding 3 cc. of water and 2 cc. of 36% hydrochloric acid, heating for four hours on the steam bath, adding 0.5 g. of chromic anhydride, and diluting with water; M. P. 102–103° C., yield 0.90 g.

The oxide, prepared as described in Example 3, separates as microcrystals from either benzene-ligroin or dilute methanol; M. P. 99.5–100.5° C.

Sulfuric acid converts the oxide to the hydroxyquinone, M. P. 105–106° C.

EXAMPLE 7

Methyl ω-(1,4-naphthoquinonyl-2) decanoate

ω-(1-hydroxy-2-naphthyl)-decanoic acid is prepared from 2-sebacoyl-1-naphthol by hydrogenation over copper chromite at 100° C. and 3000 lbs. and also by Clemmensen-Martin reduction (acetic acid-water-hydrochloric acid-toluene; yield 72.3%). The acid is very soluble in acetone, benzene, or alcohol and slightly soluble in ligroin. Crystallization from benzene-ligroin raises the M. P. to 96–97.5° C.

The methyl ester, prepared from 10 g. of acid, 50 cc. of methanol, and 1 cc. of boron fluoride etherate (refluxed one hour) and crystallized from ligroin, melts at 60–62° C.

The ethel ester prepared similarly, melts at 52° C.

Methyl ω-(1,4-naphthoquinonyl-2)-decanoate, prepared by oxidation of the naphthol ester, melts at 63–64° C.

EXAMPLE 8

Ethyl ω-(3-bromo-1,4-naphthaquinonyl-2)-decanoate

A mixture of 35.6 g. of the quinone ester, 200 cc. of acetic acid, 24 g. of anhydrous sodium acetate, and 6 cc. of bromine is shaken in a glass-stoppered flask for about six hours, or until all the sodium acetate has dissolved, and let stand in the dark for eight days. The bromo ester that separates is collected (filtrate saved) washed with 50% methanol, and crystallized from alcohol to give 30.5 g. of material, M. P. 87–88° C. The acetic acid mother liquor when diluted with one volume of water and let stand affords a precipitate that is crystallized from the alcoholic mother liquor of the first crop to give 7 g. of serviceable product, M. P. 85–87° C.; total yield 86%. The analytical sample melts at 87.5–89° C.; the substance is light sensitive.

The following examples illustrate the production of various 2-acylated-1-naphthols which may be converted to the corresponding substituted 1,4-naphthoquinones by successive reduction of the keto group and oxidation as described in Examples 2 and 3.

EXAMPLE 9

2-(4'-cyclohexylbutyryl)-1-napththol

A mixture of 123 g. of cyclohexylbutyric acid, 101 g. of α-naphthol, and 600 cc. of boron fluoride etherate is heated on the steam bath for five hours; water is added and the mixture heated on the steam bath to remove ether and cooled. The complex is decomposed by boiling it with alcohol and the product is crystallized from alcohol to give 170 g. (80%) of the acylnaphthol, M. P. 103-104° C.

EXAMPLE 10

2-(γ-p-phenoxyphenylbutyryl)-1-napththol

The procedure is the same as in Example 9, using γ-p-phenoxyphenylbutyric acid the yield of product, M. P. 121-123° C. from alcohol, is 90%.

EXAMPLE 11

2-lauroyl-1-naphthol

This ketone is obtained in 82% yield by the procedure of Example 9 using lauric acid; M. P. 75-77° C. from alcohol.

EXAMPLE 12

2-myristoyl-1-naphthol

The yield of ketone (M. P. 80-82° C. from alcohol) by the procedure of Example 9 using myristic acid is 83%.

EXAMPLE 13

2-ω-bromoundecoyl-1-naphthol

The procedure of Example 9 using ω-bromoundecoic acid affords this ketone in 75% yield; M. P. 104-105° C.

EXAMPLE 14

2-stearoyl-1-naphthol

The same procedure (Exampe 9) using stearic acid affords this ketone in 72.6% yield. Crystallization from dioxane-ethanol gives oblong plates, M. P. 87-88° C.

EXAMPLE 15

2-octadecyl-1-naphthol

Clemmensen reduction of the ketone of Example 14 gives the crude alkylnaphthol (M. P. 64-67° C.) in 98% yield. On recrystallization from ethanol-water the substance forms yellowish plates, M. P. 62-63.6° C.

I claim:

1. A method of making 1,4-naphthoquinones containing in the 2-position a group selected from alkyl and carboxyalkyl groups which comprises condensing an acid of the group consisting of alkyl carboxylic acids, aralkyl carboxylic acids, and alkyl dicraboxylic acids with α-naphthol in the presence of a condensation catalyst, reducing the keto group of the ketonaphthol thereby produced and oxidizing the resultant 2-substituted naphthol to the corresponding 1,4-naphthoquinone with chromic acid.

2. A method of making ω-(1,4-naphthoquinonyl-2)-decanoic acid which comprises condensing sebacic acid with λ-naphthol in the presence of a condensation catalyst, reducing the keto group of the 2-sebacoyl-1-naphthol thereby produced, and oxidizing the resultant 2-carboxynonyl-1-naphthol to the corresponding 1,4-naphthoquinone with chromic acid.

3. In the production of 1,4-napthoquinones containing an alkyl group in the 2-position the step which comprises condensing an alkyl carboxylic acid with ω-naphthol in the presence of boron fluoride to produce the corresponding 2-acyl-1-naphthol.

4. A method of producing 2-acyl-1-naphthols which comprises heating an alkyl carboxylic acid with γ-naphthol in the presence of boron fluoride to produce the corresponding 2-acyl-naphthol.

GEORGE FAWAZ.

REFERENCES CITED

The following references are of record in the file of this patent:

UNITED STATES PATENTS

| Number | Name | Date |
| --- | --- | --- |
| 2,398,418 | Fieser | Apr. 16, 1946 |

OTHER REFERENCES

Fieser: Jour. Am. Chem. Soc., pp. 3237-3244, 3352-3355 (1948).

Witt: Ber. 21, 324 (188).